(12) United States Patent
Silverbrook

(10) Patent No.: US 8,030,079 B2
(45) Date of Patent: *Oct. 4, 2011

(54) HAND-HELD VIDEO GAMING DEVICE WITH INTEGRAL PRINTER

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 45 days.

This patent is subject to a terminal disclaimer.

(21) Appl. No.: 12/482,424

(22) Filed: Jun. 10, 2009

(65) Prior Publication Data

US 2009/0247294 A1 Oct. 1, 2009

Related U.S. Application Data

(63) Continuation of application No. 11/525,850, filed on Sep. 25, 2006, now Pat. No. 7,556,564, which is a continuation of application No. 10/920,286, filed on Aug. 18, 2004, now Pat. No. 7,125,337, which is a continuation of application No. 10/636,194, filed on Aug. 8, 2003, now Pat. No. 7,118,481, which is a continuation-in-part of application No. 09/437,007, filed on Nov. 9, 1999, now Pat. No. 6,835,135.

(30) Foreign Application Priority Data

Nov. 9, 1998 (AU) .................................. PP7020

(51) Int. Cl.
*A63F 9/24* (2006.01)

(52) U.S. Cl. ................. 436/36; 436/46; 436/47; 436/37; 436/1; 347/49

(58) Field of Classification Search .................. None
See application file for complete search history.

(56) References Cited

U.S. PATENT DOCUMENTS

| | | |
|---|---|---|
| 3,843,132 A | 10/1974 | Ferguson |
| 4,095,791 A | 6/1978 | Smith et al. |
| 4,531,740 A | 7/1985 | Green et al. |
| 4,829,324 A | 5/1989 | Drake et al. |
| 4,890,832 A | 1/1990 | Komaki |
| 4,904,100 A | 2/1990 | Enix |
| 4,937,676 A | 6/1990 | Finelli et al. |
| 4,961,088 A | 10/1990 | Gilliland et al. |
| 5,144,340 A | 9/1992 | Hotomi et al. |
| 5,155,502 A | 10/1992 | Kimura et al. |
| 5,291,243 A | 3/1994 | Heckman et al. |
| 5,294,782 A | 3/1994 | Kumar |
| 5,408,669 A | 4/1995 | Stewart et al. |
| 5,419,543 A | 5/1995 | Nakamura et al. |
| 5,462,375 A | 10/1995 | Isobe et al. |

(Continued)

FOREIGN PATENT DOCUMENTS

EP 0848540 A 6/1998

(Continued)

*Primary Examiner* — Dmitry Suhol
*Assistant Examiner* — Matthew Russell

(57) ABSTRACT

A hand-held video gaming device comprises a games console comprising a disc reader module configured to load a game stored on a disc; a printer module configured to print game information on print media, the printer module being hingedly mounted above the games console, and functioning as a pivotable cover for the game console; and a controller module releasably engaged with the printer module, and configured to communicate wirelessly with the games console to enable control of the games console.

5 Claims, 10 Drawing Sheets

U.S. PATENT DOCUMENTS

| | | | |
|---|---|---|---|
| 5,493,409 A | 2/1996 | Maeda et al. | |
| 5,513,922 A | 5/1996 | Umbach | |
| 5,520,470 A | 5/1996 | Willett | |
| 5,535,371 A | 7/1996 | Stewart et al. | |
| 5,559,932 A | 9/1996 | Machida et al. | |
| 5,566,290 A | 10/1996 | Silverbrook | |
| 5,623,581 A | 4/1997 | Attenberg | |
| 5,647,484 A * | 7/1997 | Fleming | 206/576 |
| 5,665,249 A | 9/1997 | Burke et al. | |
| 5,666,141 A | 9/1997 | Matoba et al. | |
| 5,678,001 A | 10/1997 | Nagel et al. | |
| 5,718,631 A | 2/1998 | Invencion | |
| 5,743,746 A | 4/1998 | Ho et al. | |
| 5,768,382 A | 6/1998 | Schneier et al. | |
| 5,802,274 A | 9/1998 | Dorak et al. | |
| 5,816,918 A | 10/1998 | Kelly et al. | |
| 5,829,745 A | 11/1998 | Houle | |
| 5,931,467 A | 8/1999 | Kamille | |
| 5,946,473 A * | 8/1999 | Lotspiech et al. | 703/15 |
| 6,012,832 A | 1/2000 | Saunders et al. | |
| 6,022,274 A | 2/2000 | Takeda et al. | |
| 6,049,450 A | 4/2000 | Cho et al. | |
| 6,082,581 A | 7/2000 | Anderson et al. | |
| 6,115,837 A * | 9/2000 | Nguyen et al. | 714/769 |
| 6,167,551 A * | 12/2000 | Nguyen et al. | 714/770 |
| 6,200,216 B1 | 3/2001 | Peppel | |
| 6,219,227 B1 | 4/2001 | Trane | |
| 6,238,043 B1 | 5/2001 | Silverbrook | |
| 6,238,044 B1 | 5/2001 | Silverbrook et al. | |
| 6,254,477 B1 | 7/2001 | Sasaki et al. | |
| 6,282,082 B1 * | 8/2001 | Armitage et al. | 361/679.22 |
| 6,293,469 B1 | 9/2001 | Masson et al. | |
| 6,325,488 B1 | 12/2001 | Beerling et al. | |
| 6,344,904 B1 | 2/2002 | Mercer | |
| 6,599,196 B2 | 7/2003 | Kikukawa et al. | |
| 6,626,529 B1 | 9/2003 | King et al. | |
| 6,628,430 B1 | 9/2003 | Silverbrook et al. | |
| 6,697,174 B2 | 2/2004 | Mercer | |
| 6,835,135 B1 | 12/2004 | Silverbrook et al. | |
| 6,914,686 B2 | 7/2005 | Silverbrook et al. | |
| 6,915,140 B2 | 7/2005 | Silverbrook | |
| 6,999,206 B2 | 2/2006 | Silverbrook | |
| 7,018,294 B2 | 3/2006 | Silverbrook et al. | |
| 7,077,748 B2 | 7/2006 | Silverbrook et al. | |
| 7,079,292 B2 | 7/2006 | Silverbrook et al. | |
| 7,118,481 B2 | 10/2006 | Silverbrook et al. | |
| 7,125,337 B2 | 10/2006 | Silverbrook | |
| 7,125,338 B2 | 10/2006 | Silverbrook | |
| 7,146,179 B2 | 12/2006 | Parulski et al. | |
| 7,158,258 B2 | 1/2007 | Silverbrook | |
| 7,255,646 B2 | 8/2007 | Silverbrook et al. | |
| 7,296,304 B2 | 11/2007 | Goldsborough | |
| 7,387,573 B2 | 6/2008 | Silverbrook et al. | |
| 7,430,067 B2 | 9/2008 | Silverbrook | |
| 7,453,586 B2 | 11/2008 | Silverbrook et al. | |
| 7,460,882 B2 | 12/2008 | Silverbrook | |
| 7,468,810 B2 | 12/2008 | Silverbrook | |
| 7,556,564 B2 * | 7/2009 | Silverbrook | 463/39 |
| 7,609,410 B2 | 10/2009 | Lapstun et al. | |
| 7,654,905 B2 * | 2/2010 | Silverbrook et al. | 463/46 |
| 2004/0252332 A1 | 12/2004 | McCoog et al. | |
| 2006/0133738 A1 | 6/2006 | Marcinkiewicz et al. | |

FOREIGN PATENT DOCUMENTS

| | | |
|---|---|---|
| JP | 60-204361 | 10/1985 |
| JP | 02-30543 | 1/1990 |
| JP | 04-1051 | 1/1992 |
| JP | 04-105113 | 4/1992 |
| JP | 04-286444 | 10/1992 |
| JP | 05-16377 | 1/1993 |
| JP | 5-64045 | 3/1993 |
| JP | 05-201081 | 8/1993 |
| JP | 05-330150 | 12/1993 |
| JP | 06-37944 | 2/1994 |
| JP | 06-149051 | 5/1994 |
| JP | 06-183117 | 7/1994 |
| JP | 07-108688 | 4/1995 |
| JP | 08-79417 | 3/1996 |
| JP | 08-90879 | 4/1996 |
| JP | 08-118653 | 5/1996 |
| JP | 08-224730 | 9/1996 |
| JP | 09-036941 | 2/1997 |
| JP | 09-113990 A | 5/1997 |
| JP | 09-116843 | 5/1997 |
| JP | 09-123474 | 5/1997 |
| JP | 09-135316 | 5/1997 |
| JP | 09-187960 | 7/1997 |
| JP | 09-267487 | 10/1997 |
| JP | 10-126728 | 5/1998 |
| JP | 09-116843 | 12/1998 |
| JP | 2-302181 | 7/2000 |
| WO | WO 96/32274 | 10/1996 |
| WO | WO 97/04353 A | 2/1997 |
| WO | WO 97/50243 A | 12/1997 |

* cited by examiner

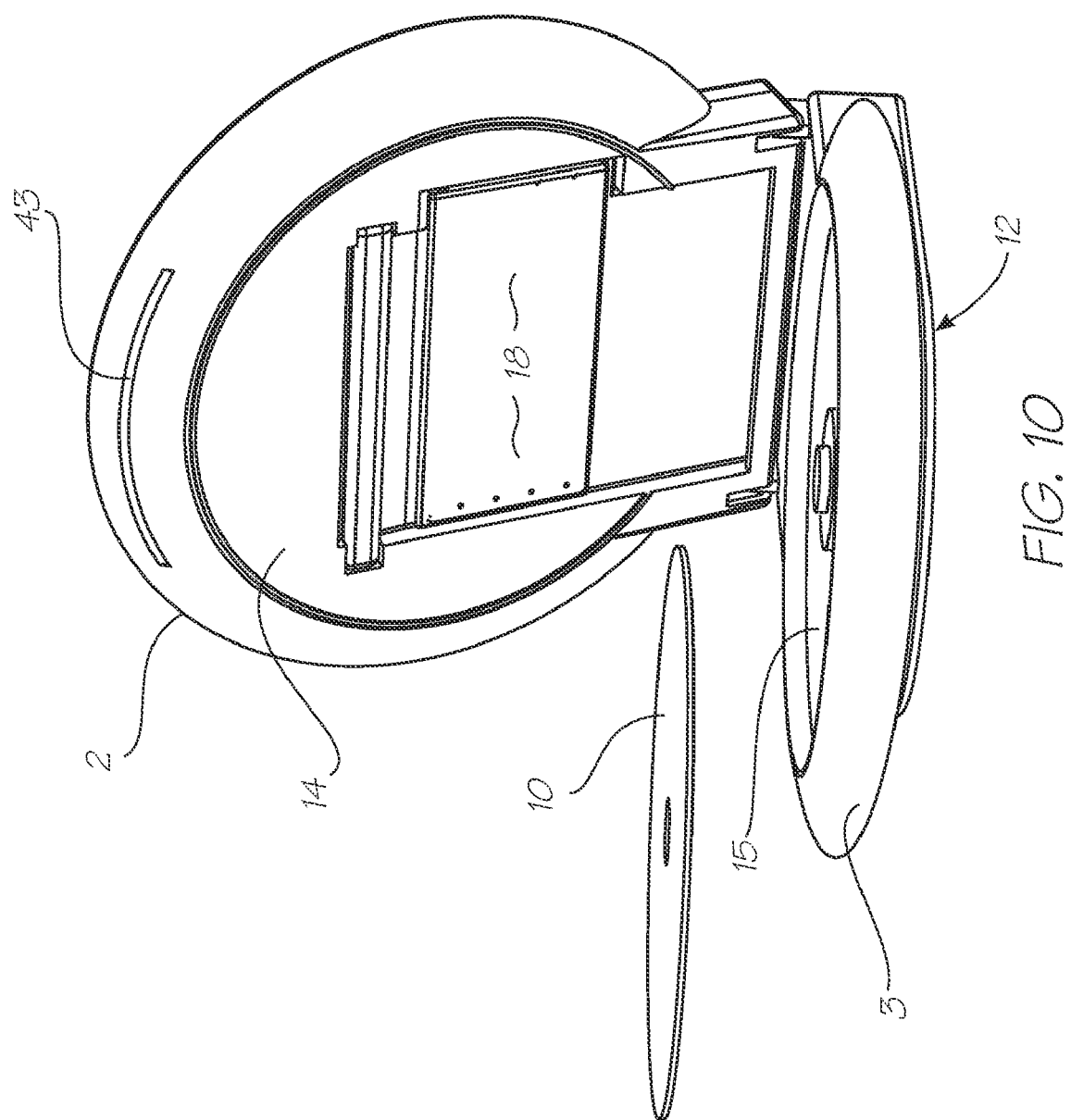

HAND-HELD VIDEO GAMING DEVICE WITH INTEGRAL PRINTER

CROSS REFERENCE TO RELATED APPLICATION

The present application is a Continuation of U.S. application Ser. No. 11/525,850 filed on Sep. 25, 2006, which is a Continuation of U.S. application Ser. No. 10/920,286 filed on Aug. 18, 2004, now issued U.S. Pat. No. 7,125,337, which is a Continuation of U.S. application Ser. No. 10/636,194 filed on Aug. 8, 2003, now issued U.S. Pat. No. 7,118,481, which is a Continuation In Part of U.S. application Ser. No. 09/437,007 filed on Nov. 9, 1999, now issued U.S. Pat. No. 6,835,135, all of which are herein incorporated by reference.

FIELD OF THE INVENTION

The present invention relates to the field of video games and, more particularly, to a video games console having an integral compact printer device.

SUMMARY OF THE INVENTION

According to an aspect of the present disclosure, a hand-held video gaming device comprises a games console comprising a disc reader module configured to load a game stored on a disc; a printer module configured to print game information on print media, the printer module being hingedly mounted above the games console, and functioning as a pivotable cover for the game console; and a controller module releasably engaged with the printer module, and configured to communicate wirelessly with the games console to enable control of the games console.

BRIEF DESCRIPTION OF THE DRAWINGS

A preferred embodiment of the invention will now be described, by way of example only, with reference to the accompanying drawings, in which:

FIG. 10 is a schematic view of the assembly shown in FIG. 9 illustrating insertion of a DVD into the DVD player module.

DESCRIPTION OF PREFERRED AND OTHER EMBODIMENTS

In the illustrated preferred embodiment, there is provided a video game player which includes an integral printer which is able to print out, preferably on business card sized cards, information which enhances the interactivity of the video game.

Figure 1:
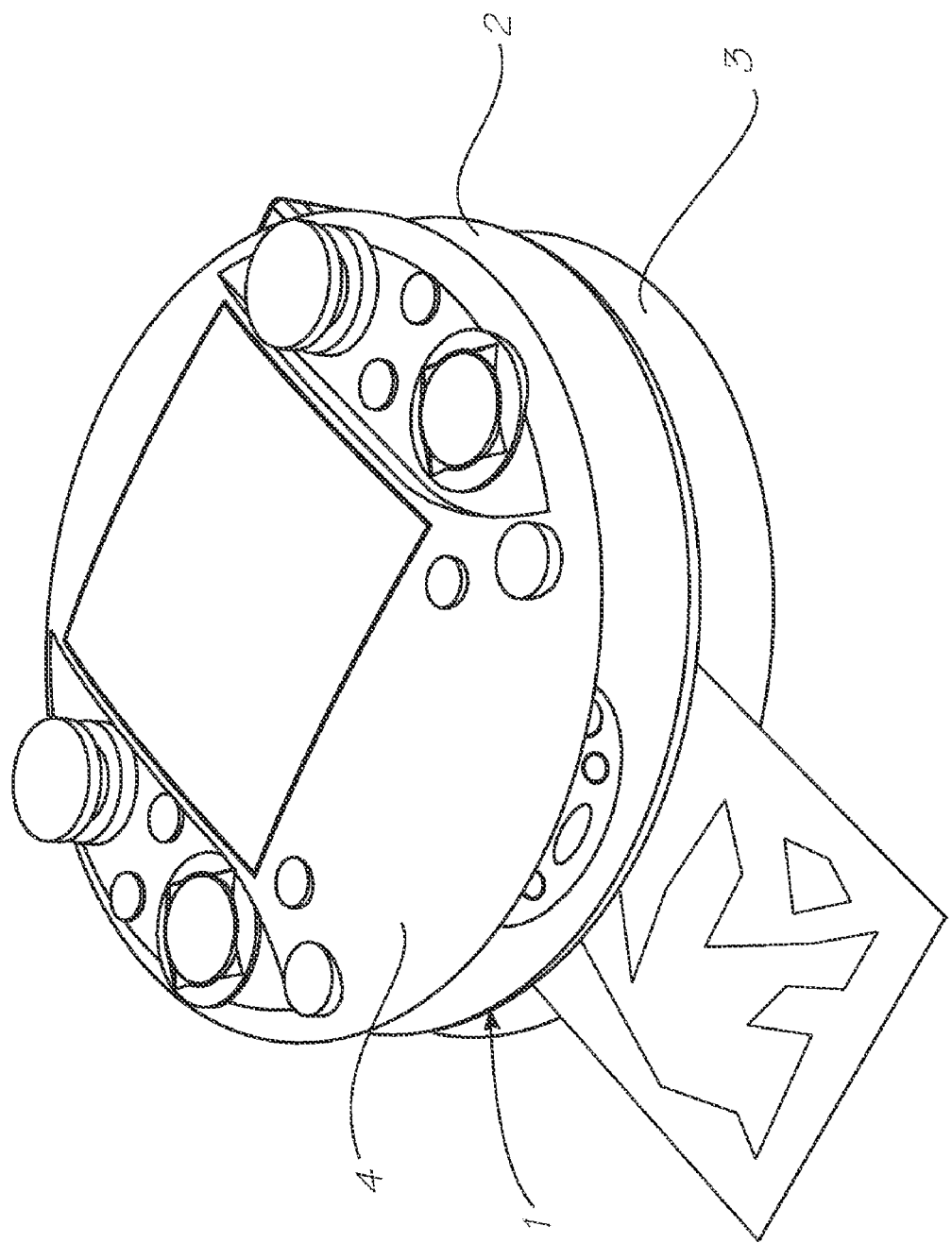
FIG. 1 is a front perspective view of a first embodiment video gaming device according to the invention with detachable controller module, illustrating a printed card being ejected from the integral printer.
Figure 2:
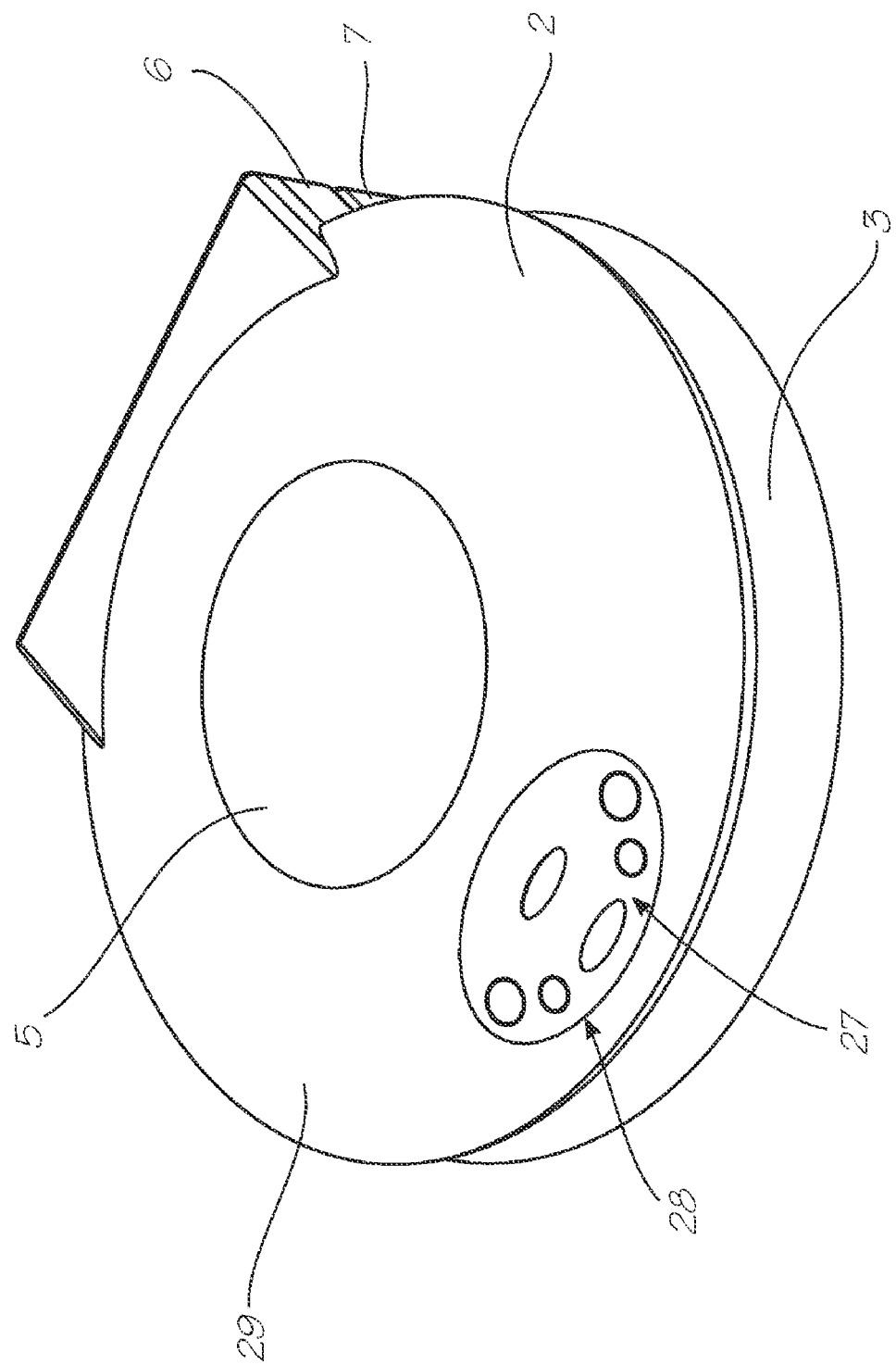
FIG. 2 is a front perspective view of the console comprising printer module and DVD module with the top controller module removed.

Turning to the drawings, there is shown a video gaming device in the form of a console 1 comprising a printer module 2 and Digital Versatile Disc (DVD) player module 3. Connected to the console is an optional detachable controller module 4 as shown in FIG. 1. The detachable controller module can communicate with the console by any suitable means including wireless systems such as "Bluetooth" or cable etc. and can be releasably secured to the console by any suitable means including magnetic coupling 5 or mechanical interlocking.

Figure 3:
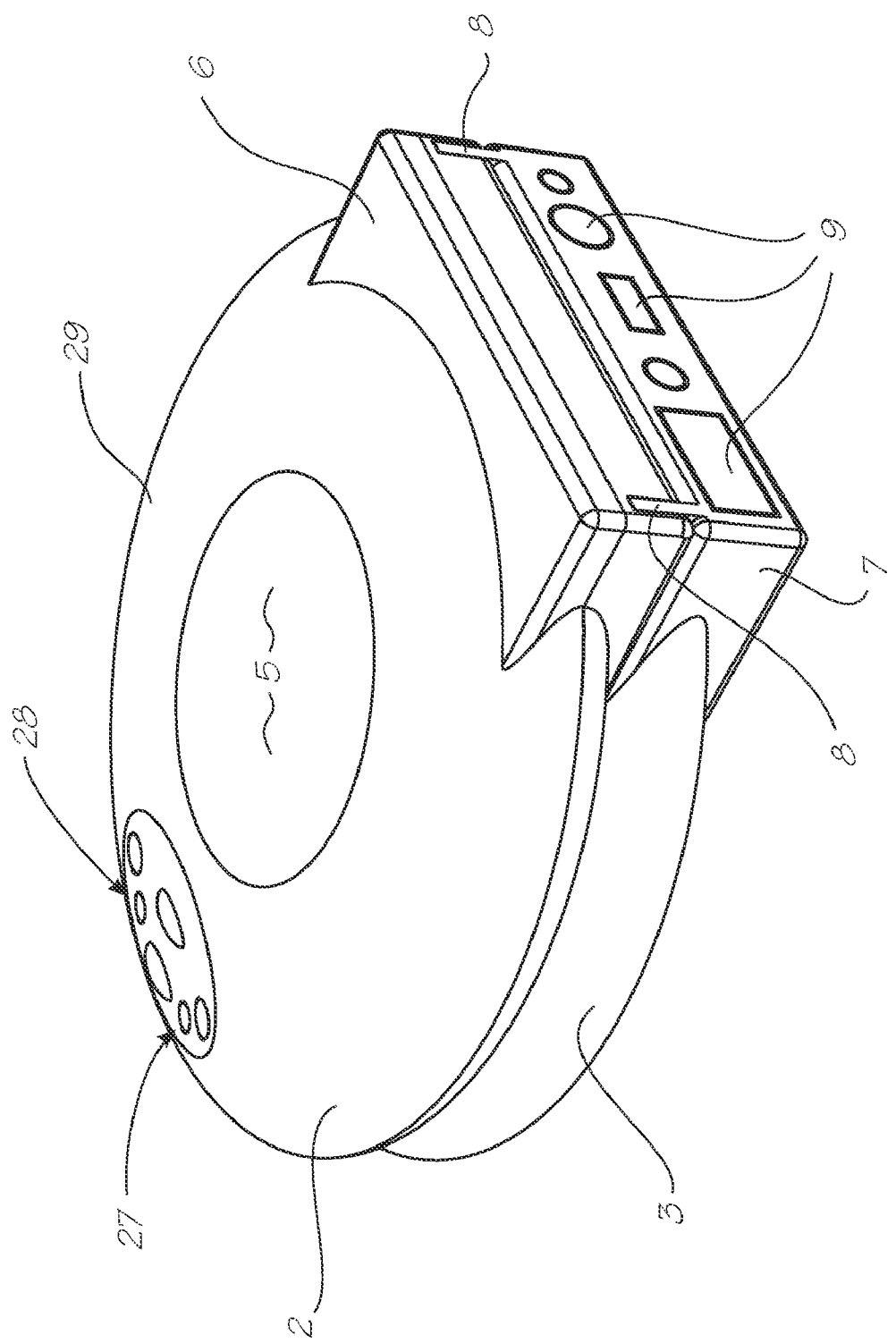
FIG. 3 is a rear perspective of the console shown in FIG. 2.
Figure 4:
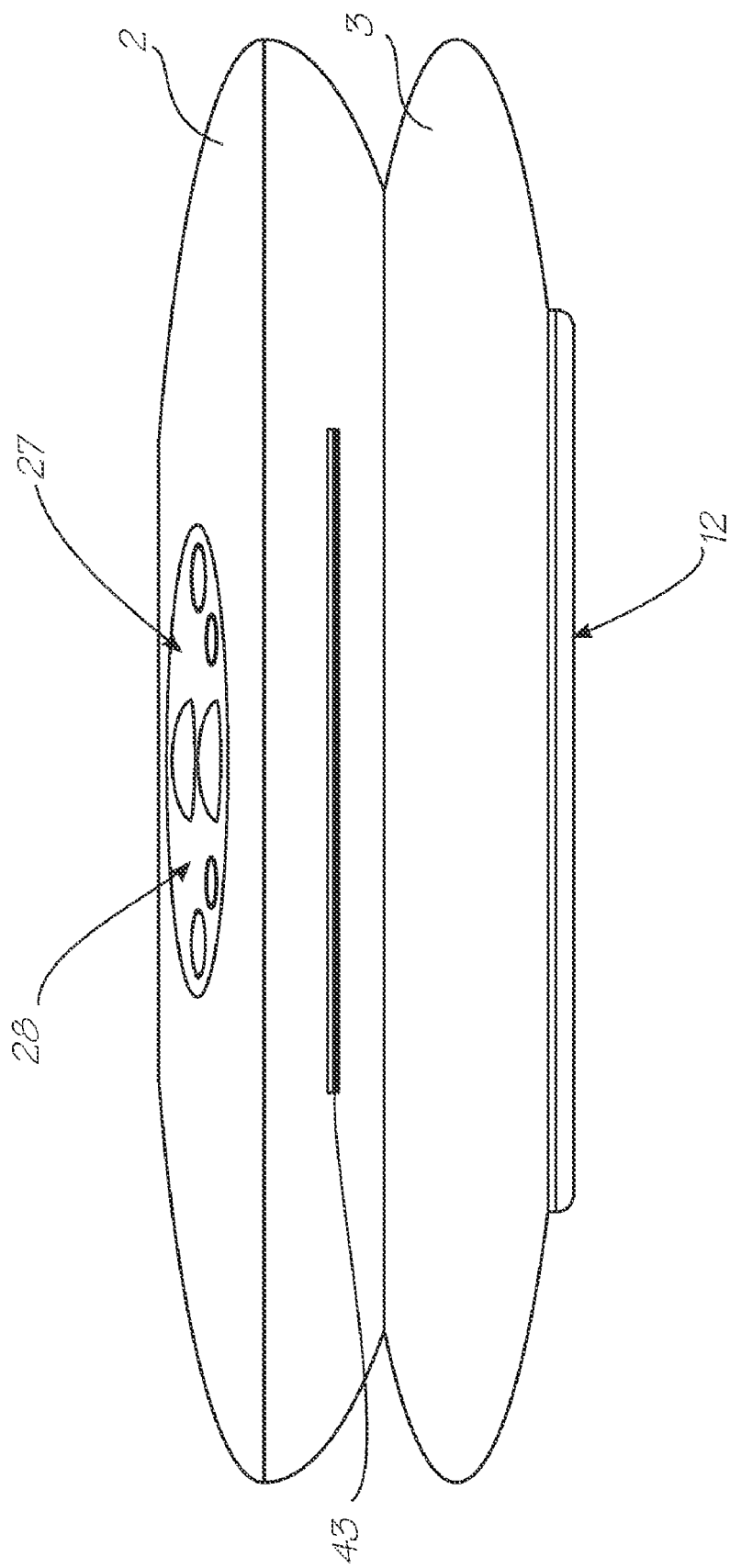
FIG. 4 is a front view of the console shown in FIGS. 2 and 3.
Figure 5:
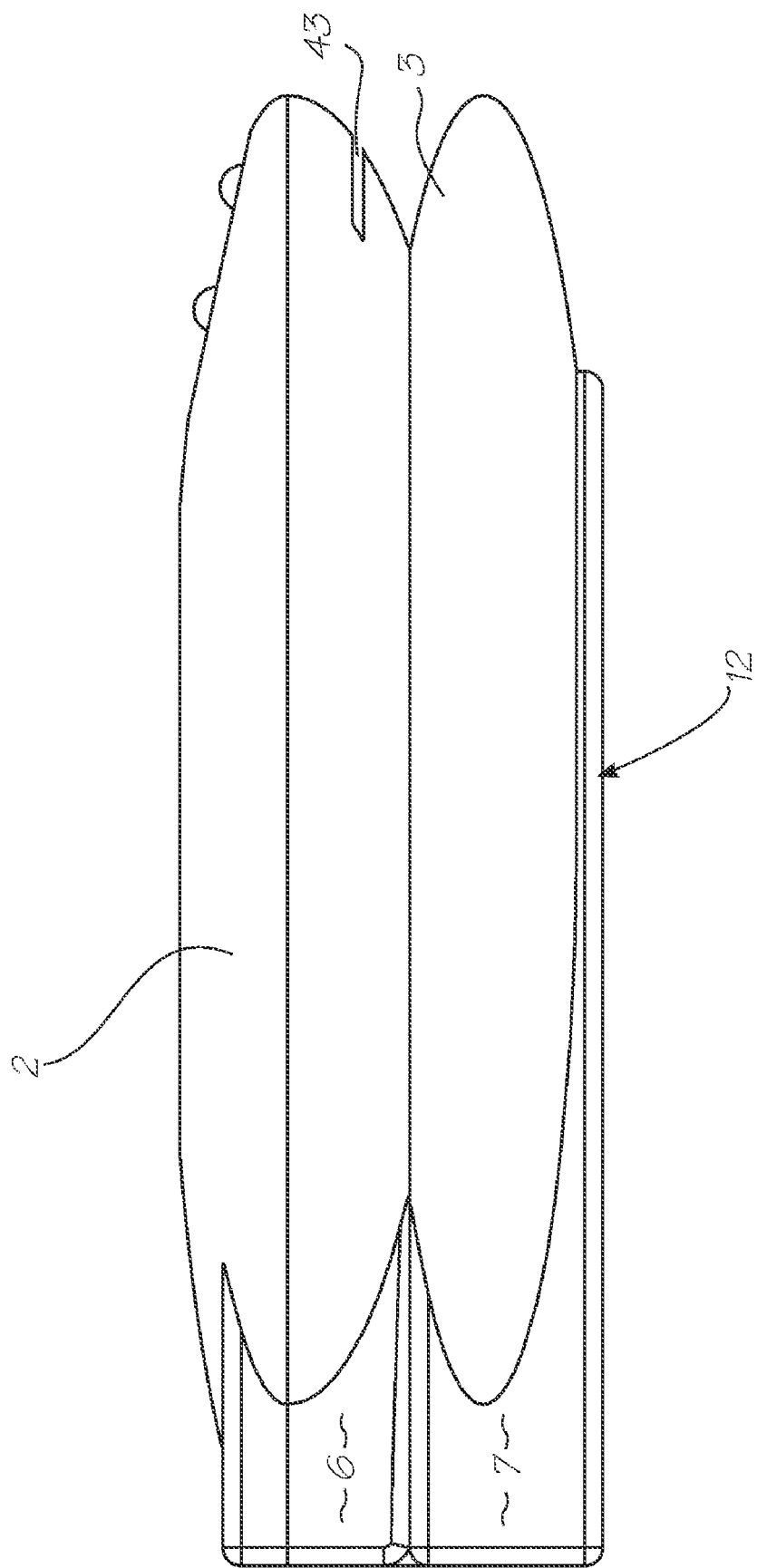
FIG. 5 is a side view of the console assembly shown in FIG. 4.
Figure 6:
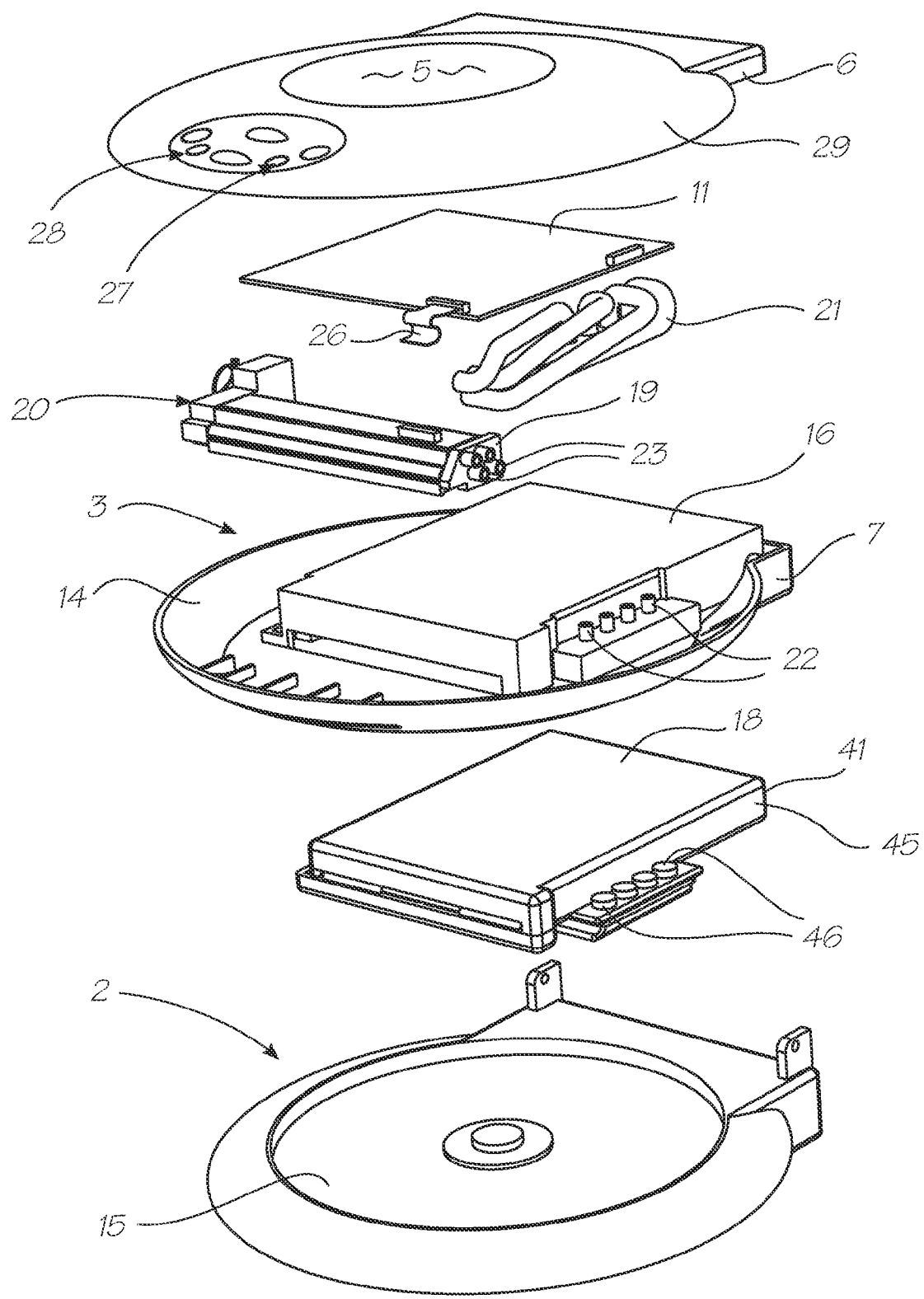
FIG. 6 is an exploded front perspective view of the console assembly shown in FIGS. 2 to 5.
Figure 7:
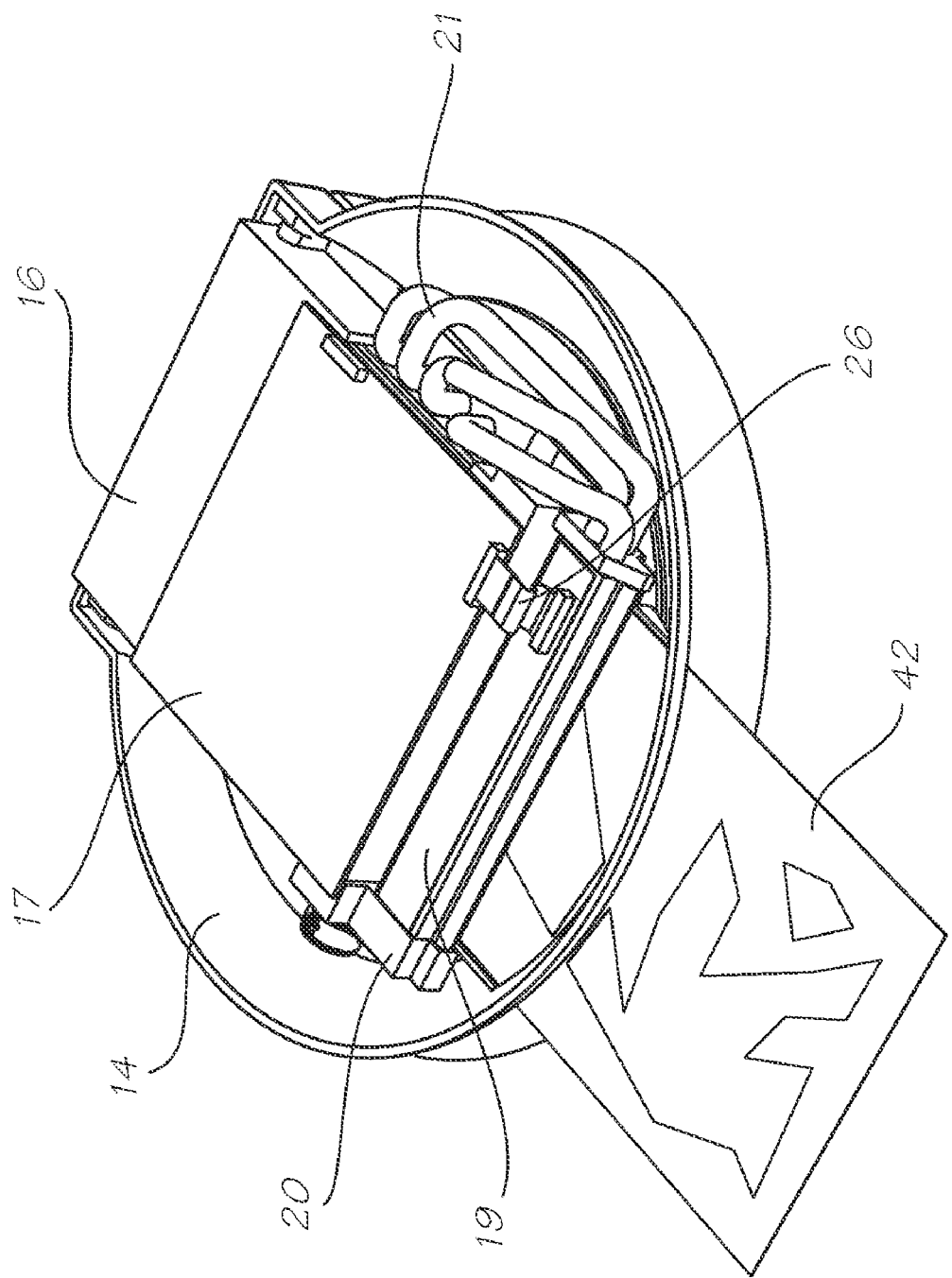
FIG. 7 is a front perspective view of the console with the printer module top cover removed.

The printer module 2 and DVD player module 3 are interconnected by means of connecting housing extensions 6 and 7 which hinge about pivots 8 as shown in FIG. 3. The lower connecting extension 7 preferably includes various input/output connectors and ports 9 for optionally connecting joysticks and other interactive devices. A video outlet port is also provided for connection with standard video type devices as is common in the art. Further ports can also be provided for an external power source or other devices such as sound systems to be interconnected to the console.

The DVD player module 3 is able to accept storage means in the form of standard DVD game discs 10 as is becoming popular in the industry. The DVD player is interconnected to a high-end processor (not shown), which can be constructed along similar lines to standard high-end video game processors. The processor in turn utilizes memory for standard video game functions and interacts with the print controller chip, which is also preferably housed with the high-end processor on PCB 11 within the printer module 2. The controller chip (also not shown) can be structured along the lines set out in U.S. Pat. No. 6,512,596, entitled 'Image creation method and apparatus' filed 9 Nov. 1998, the contents of which are again incorporated by cross reference. Batteries for driving the console are preferably located in the base of the DVD player module as shown by arrow 12.

The printer module 2 is preferably constructed so as to simultaneously provide a closure for the DVD player module 3. This is achieved by hinging the printer unit to the DVD module as shown. The printer module 2 comprises a base moulding 14 that is configured to fully enclose a DVD disk-receiving compartment 15 formed in the upper surface of the DVD player module 3. The base moulding 14 is further configured to define an integral chassis structure 16 adapted on its under side to receive and locate an ink and paper cartridge 18.

The upper surface of the chassis structure 16 is configured to support a printhead and ink distribution assembly 19, print media feed mechanism 20, and ink connecting hoses 21, the latter linking ink outlet nozzles 22 on the chassis with ink inlet nozzles 23 provided on the printhead and ink distribution assembly 19. The printer and DVD control PCB 10 is also supported on the chassis 16 and has flexible connections 26 extending therefrom to interconnect the DVD and printer control buttons 27 and 28 provided on a top cover moulding 29.

Figure 8:
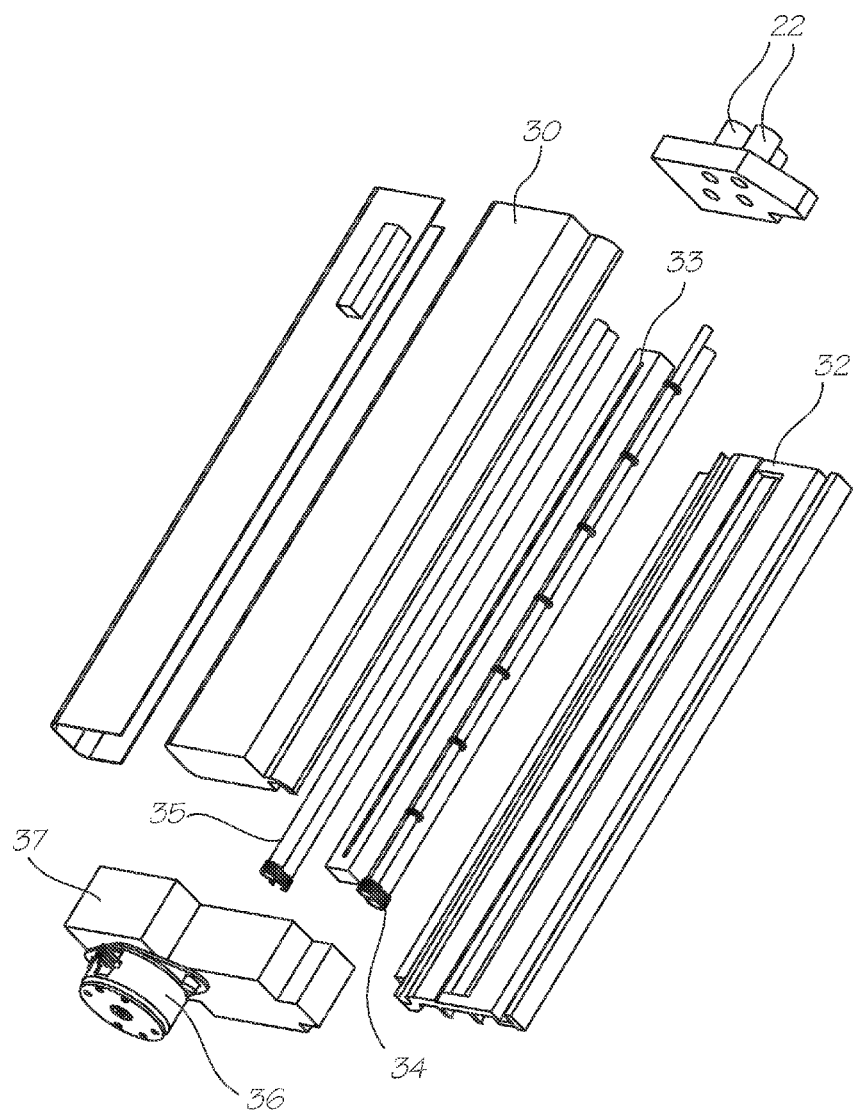
FIG. 8 is an exploded perspective view of the printer apparatus including the printhead, print media feed mechanism and printhead ink distribution assembly but excluding the ink supply.
Figure 9:
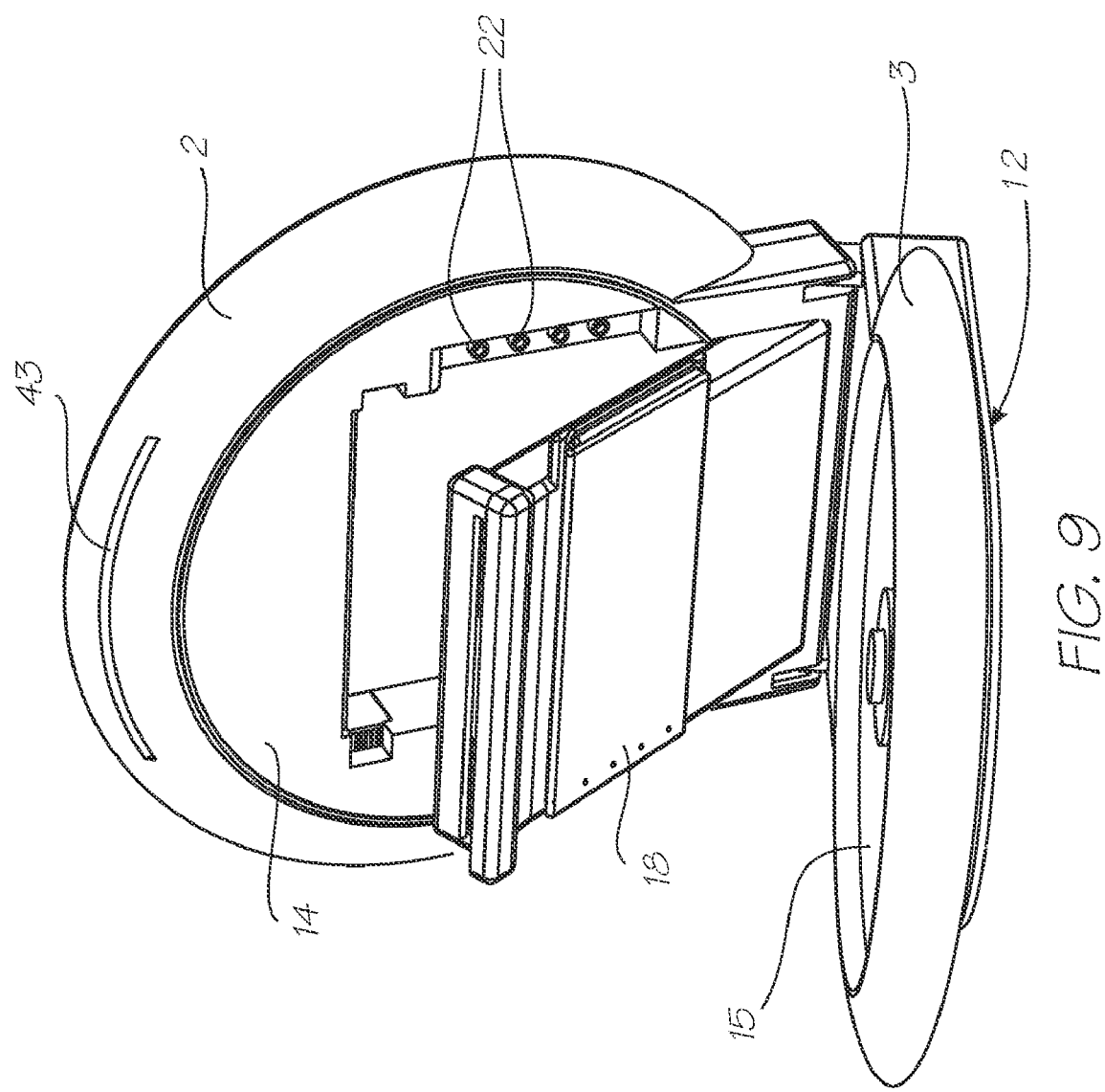
FIG. 9 is a front perspective view of the console showing the printer module in the raised position for insertion of the print media and ink supply cartridge.

Details of the printhead, ink distribution assembly and print media feed means are best illustrated in FIG. 8. The printhead, which is preferably in the form of a pagewidth ink jet printhead chip, is packaged with an ink distribution unit and printhead cover into a printhead module 30. This module

30 is supported on a printhead chassis moulding 32, and further includes a printhead capping mechanism 33, paired drive rollers 34 and 35, stepper motor 36 and an associated gear box 37 that engages the drive rollers 34 and 35.

The preferred ink and paper cartridge is preferably in accordance with that described in the applicant's co-pending U.S. patent application Ser. No. 09/436,508 the contents of which are incorporated herein by reference. In the alternate embodiment illustrated in the accompanying drawings the ink and paper cartridge comprises a casing 40 defining an upper print media storage region 41 adapted to hold a stack of paper cards or sheets 42. A card-dispensing outlet is shown at 43. The lower portion of the casing defines an ink supply region 45 that is separated internally into four sections each of which connect with piercable ink supply outlets 46. Upon installation, these outlets 46 are pierced by formations in the underside of the base moulding so that ink flows from the cartridge to the outlet nozzles on the chassis 16, via connecting hoses 21, to the printhead and ink distribution assembly 19.

In yet another embodiment, the printer unit and print media container can be snap fitted into the console.

In use, the console is connected to a video device and a DVD 48 is inserted into the DVD player module 3. Appropriate controllers are then selected. These may be the detachable controller module 1 as shown in FIG. 1, or alternatively other external interactive controllers. The printer can then be operated during execution of the program in the DVD either manually or automatically as discussed in more detail below.

It will be evident to those skilled in the art that the preferred embodiment provides for a video game system enabling print on demand cards. These cards can be utilized for a number of purposes. Firstly, the video game can, at certain predetermined levels, print out a series of 'brag cards'. These can provide a high-resolution picture that can only be achieved at a certain point in the game. The brag cards can be personalized with the game players name, score, chosen character, accumulated wealth or objects, etc. The cards could also include a photographic likeness where the video game arrangement includes an optional image sensor (not shown). With such an option, the brag cards could also be personalized with a photographic likeness mapping on to 3D characters etc.

The DVD player can be adapted to play standard DVD movies in addition to being configured to read CD-ROMs so as to provide information from encyclopedias, maps etc provided by other CD-ROMs or DVD disks. In this manner, images from DVD movies and information from such CD-ROM or DVD repositories can be printed out. It should be noted that while the preferred form uses a DVD player or drive, the interactive programs may be stored on CD-ROM or on semiconductor memory cartridges, the latter being popularly used with pocket sized prior art video game devices.

Additionally, although the preferred embodiment described is designed for optional use with non portable external display and control devices, the game storage medium, controls, game processor, screen, audio and printer may all be housed in the same housing, and this may be pocket sized if required.

Where educational software is provided, the printer can be utilized to print out standard award certificates or diplomas upon reaching various levels. Such a system provides for an ideal incentive for children utilizing the system to become further involved in educational software running on the system. The utilization of the printer also allows parents to monitor children in the utilization of the device through, for example, the demanding of certain information or diploma certificates being printed out at various steps before the device can be utilized as a game-playing machine. The arrangement can be synergistic between the game playing and educational software, where the educational software prints out a code or clue for utilization by the user in playing the games. Of course, many other interactive uses can be provided.

It will be appreciated by those skilled in the art that numerous variations and/or modifications may be made to the present invention as shown without departing from the spirit or scope of the invention as broadly described. Accordingly, the present embodiment is to be considered in all respects to be illustrative and not restrictive.

I claim:

1. A hand-held video gaming device comprising:
    a games console comprising a disc reader module configured to load a game stored on a disc;
    a printer module configured to print game information on print media, the printer module being hingedly mounted above the games console, and functioning as a pivotable cover for the game console; and
    a controller module releasably engaged with the printer module, and configured to communicate wirelessly with the games console to enable control of the games console, wherein
    the controller module includes one of a mechanical interlocking or a magnetic coupling means to effect releasable engagement of the controller module with the printer module.

2. A hand-held video gaming device as claimed in claim 1, further comprising I/O ports for interconnecting external devices.

3. A hand-held video gaming device as claimed in claim 2, wherein the I/O ports comprise a game joystick input port and a video output port.

4. A hand-held video gaming device as claimed in claim 1, wherein the disc reader module is a digital versatile disc (DVD) player configured to play a movie loaded on a DVD.

5. A hand-held video gaming device as claimed in claim 1, wherein the disc reader is a compact disc (CD) player configured to play music loaded on a CD.

* * * * *